United States Patent
Leitman et al.

(10) Patent No.: US 8,769,519 B2
(45) Date of Patent: Jul. 1, 2014

(54) PERSONAL AND POOLED VIRTUAL MACHINE UPDATE

(75) Inventors: Robert K. Leitman, Redmond, WA (US); Kashif Mehmood, Bellevue, WA (US); Amjad Hussain, Kirkland, WA (US); Ido Miles Ben-Shachar, Kirkland, WA (US); Sriram Sampath, Redmond, WA (US); Ajay Kumar, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 124 days.

(21) Appl. No.: 13/315,270

(22) Filed: Dec. 8, 2011

(65) Prior Publication Data

US 2013/0152077 A1 Jun. 13, 2013

(51) Int. Cl.
*G06F 9/44* (2006.01)
*G06F 9/455* (2006.01)
*G06F 9/445* (2006.01)

(52) U.S. Cl.
CPC *G06F 86/67* (2013.01); *G06F 8/65* (2013.01); *G06F 9/455* (2013.01)
USPC ............... 717/168; 717/172; 718/1

(58) Field of Classification Search
USPC .............. 718/1, 100; 717/168, 169, 170, 171, 717/172, 173
See application file for complete search history.

(56) References Cited

U.S. PATENT DOCUMENTS

| | | | |
|---|---|---|---|
| 6,199,204 B1* | 3/2001 | Donohue | 717/178 |
| 6,976,251 B2* | 12/2005 | Meyerson | 717/173 |
| 6,977,994 B2* | 12/2005 | Stephenson et al. | 379/93.01 |
| 7,814,495 B1* | 10/2010 | Lim et al. | 718/104 |
| 8,205,194 B2* | 6/2012 | Fries et al. | 717/168 |
| 8,359,594 B1* | 1/2013 | Davidson et al. | 718/1 |
| 2004/0205748 A1* | 10/2004 | Iyer | 717/174 |
| 2008/0133622 A1* | 6/2008 | Brown et al. | 707/204 |
| 2009/0216975 A1 | 8/2009 | Halperin et al. | |
| 2010/0070978 A1 | 3/2010 | Chawla et al. | |
| 2010/0275200 A1 | 10/2010 | Radhakrishnan et al. | |
| 2011/0071983 A1* | 3/2011 | Murase | 707/649 |
| 2011/0197051 A1 | 8/2011 | Mullin et al. | |
| 2012/0198448 A1* | 8/2012 | Cervantes et al. | 718/1 |

OTHER PUBLICATIONS

"Centralized Licensing Management for Microsoft VDI", Retrieved on: Aug. 29, 2011, Available at: http://blogs.msdn.com/b/rds/archive/2010/12/05/centralized-licensing-management-for-microsoft-vdi.aspx.

(Continued)

*Primary Examiner* — Qing Wu
(74) *Attorney, Agent, or Firm* — Jim Sfekas; David Andrews; Micky Minhas

(57) ABSTRACT

The updating of virtual machines. A task broker schedules update tasks for multiple virtual machines on the host machine. As each update task is to be performed, if the virtual machine is not currently running, as might be the case for a personal virtual machine, the virtual machine is caused to begin running to allow the update task to be performed on the virtual machine. Also, a pooled virtual machine is updated by copying information from the old virtual hard drive to a location to allow the information to be preserved as the master image is updated. After the update is completed, the virtual machine is formed, associated with the new virtual hard drive, and copied back to the virtual machine.

16 Claims, 6 Drawing Sheets

(56) References Cited

OTHER PUBLICATIONS

"ClearCube Sentral—Award Winning Software", Retrieved on: Aug. 29, 2011, Available at: http://www.clearcube.com/sentral-pc-management-virtual-desktop-management.html.

Humphreys, et al., "The Path to Enterprise Desktops: From Personal Computers to Personalized Computing", Published on: Jul. 2007, Available at: http://www.gtsi.com/eblast/corporate/cn/02_25_2010/PDFs/IDC%20The%20path%20to%20enterprise%20desktops.pdf.

"Microsoft Virtual Desktop Infrastructure (VDI) Explained", Retrieved on: Aug. 29, 2011, Available at: http://blogs.technet.com/b/yungchou/archive/2010/01/06/microsoft-virtual-desktop-infrastructure-vdi-explained.aspx.

* cited by examiner

PERSONAL AND POOLED VIRTUAL MACHINE UPDATE

BACKGROUND

A virtual machine is an executable object that is capable of emulating an entire computing system, including the operating system, potentially also applications, and corresponding state. The virtual machine may also have access to virtual hardware, such as a virtual hard drive, via a hypervisor. Often, multiple virtual machines run on the same server, and each virtual machine have a corresponding user. The virtual machines provide a complete isolation model such that one user's interaction with the computing system emulated by one virtual machine does not interact or interfere in any way with another virtual machine that emulates another computing system, even though those virtual machines operate on the same server. Such virtual machines are helpful in providing remote desktop capability in which the virtual machine provides the underlying processing capability for a client machine which can be remotely located. The virtual machine responds to events such as user input transmitted from the client to the virtual machine, and serves up desktop images (or graphics instructions) representing the desktop state corresponding to the virtual machine state.

Virtual machines can be pooled virtual machines or personal desktop virtual machines (also called herein "personal virtual machines"). Pooled virtual machines are created from the same master image, and thus are created in the same initial state. As users interact with the pooled virtual machine, the state of the virtual machine may change, but that changed state (including any user data) is not preserved when the user logs off the virtual machine. Thus, when a user is allocated a virtual machine from a pool of virtual machines, one virtual machine is not initially distinguishable from another.

Personal virtual machines, on the other hand, may be initially created by a master image. However, the personal virtual machine is allocated to the user for more than the duration of just that one session, and perhaps permanently. Thus, changes made to the state (such as user data) is preserved even after the user logs off from the corresponding virtual machine and also across virtual machine shutdown cycles. Thus the next time the user runs the personal virtual machine, the user may continue where he/she left off.

BRIEF SUMMARY

At least one embodiment described herein relates to the updating of virtual machines running on a host machine. In at least one embodiment described herein, a task broker schedules update tasks for multiple virtual machines on the host machine. As each update task is to be performed, if the virtual machine is not currently running (as might be the case if the virtual machine is a personal virtual machine in a saved state), then the virtual machine is caused to begin running to allow the update task to be performed on the virtual machine. In some embodiments, the task broker may perform load balancing such that not too many virtual machines are woken to perform update tasks.

In at least one embodiment described herein, a pooled virtual machine is updated by updating a corresponding master image from which the pooled virtual machine is created. However, information is preserved from the old version of the pooled virtual machine to the new version of the pooled virtual machine. Information is saved from the old virtual hard drive to a location external to the old virtual hard drive. The old virtual hard drive is then disconnected from the virtual machine. The virtual machine is then associated with the new virtual hard drive that reflects the update. At least some of the information (the information that is to be preserved) is then copied back to the updated virtual hard drive. Such copied information might include, for example, an identifier of the virtual machine and/or an identifier for an update instructor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the updating of virtual machines is described. As an example, a task broker schedules update tasks for multiple virtual machines on the host machine. As each update task is to be performed, if the virtual machine is not currently running, as might be the case for a personal virtual machine, the virtual machine is caused to begin running to allow the update task to be performed on the virtual machine.

Also, information is preserved across the updating of a pooled virtual machine in which the corresponding master image is updated. This preservation occurs by copying information from the old virtual hard drive to an external location. The pooled virtual machine is then disconnected from the old virtual hard drive, and connected to the new virtual hard drive that reflects the updated master image. At least some of the preserved information is then copied back to the new virtual hard drive. First, some introductory discussion regarding computing systems will be described with respect to FIG. 1. Then, the embodiments of the virtual machine updating will be described with respect to FIGS. 2 through 8E.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
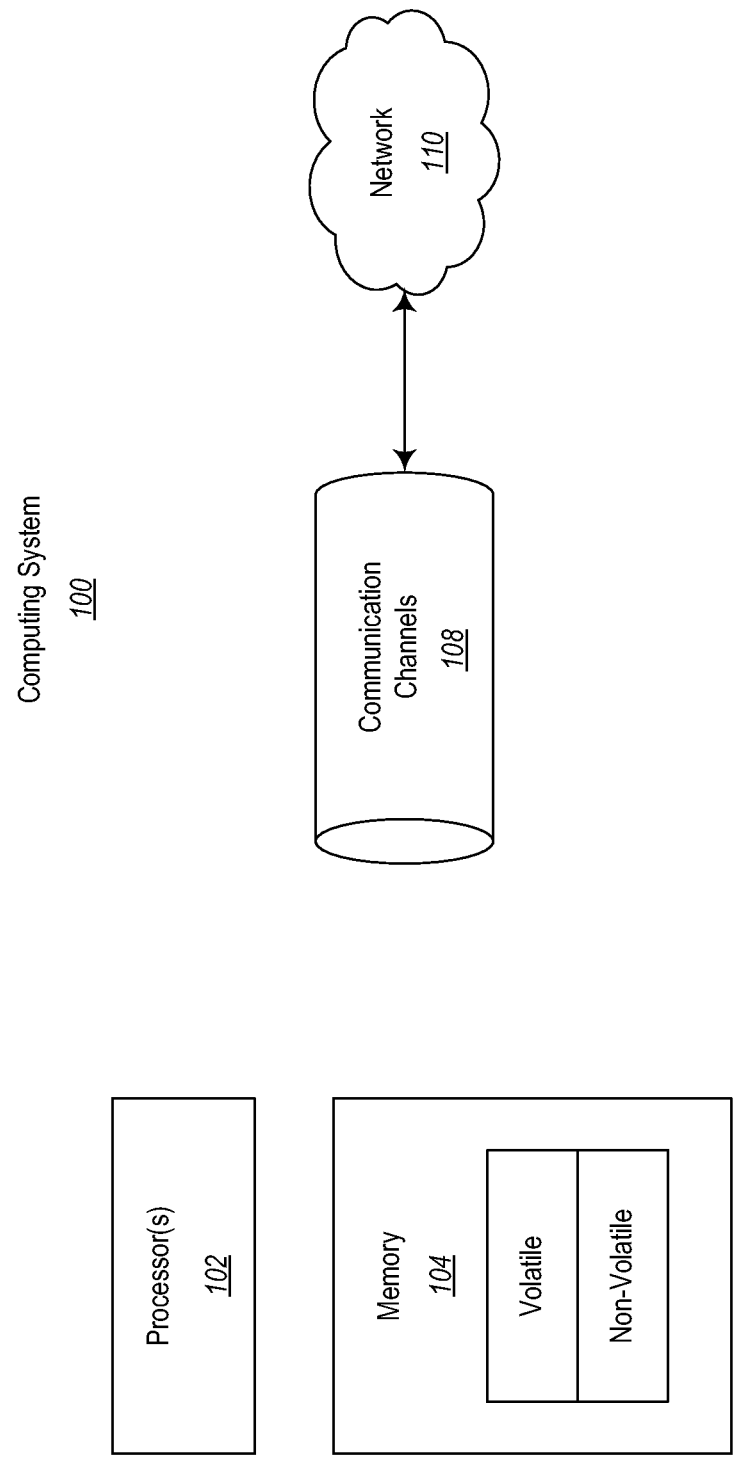
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
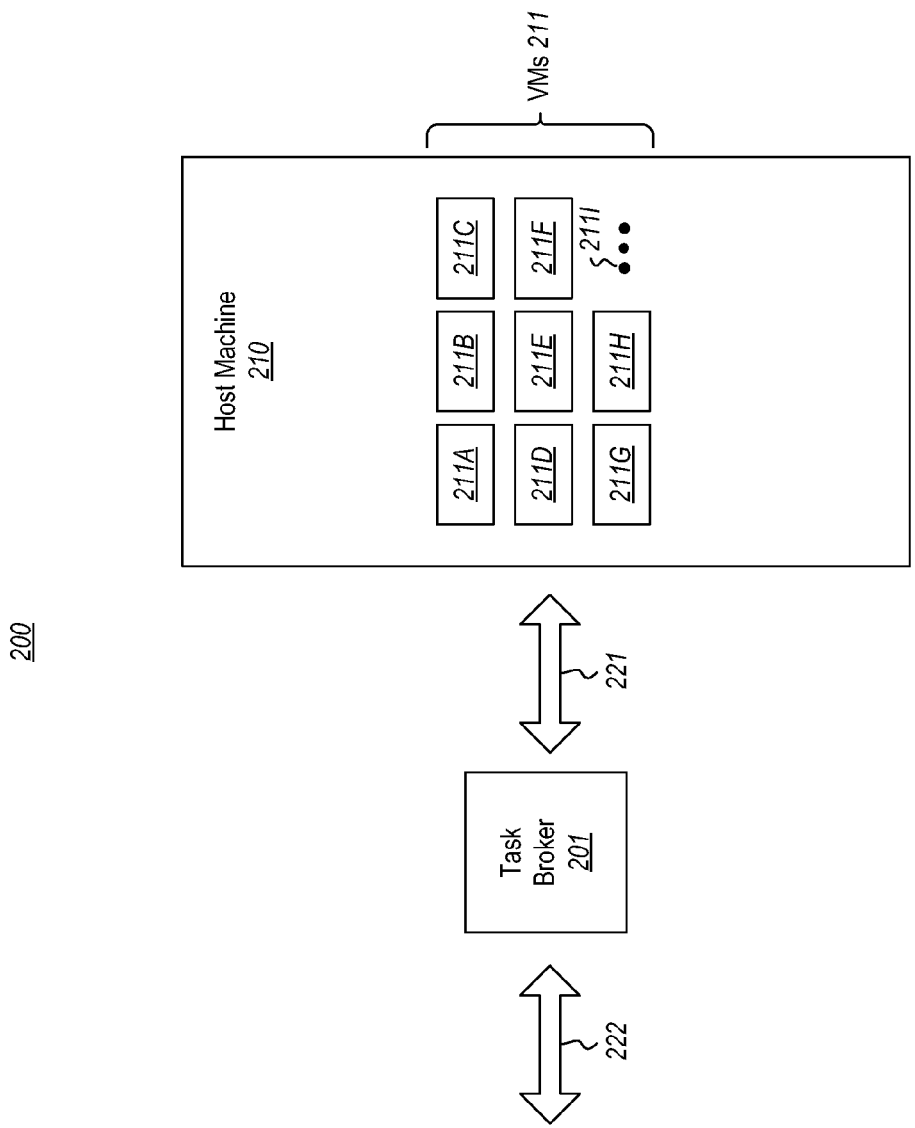
FIG. 2 illustrates an environment in which a task broker schedules updates tasks to occur on virtual machines running on a host machine.

FIG. 2 illustrates an environment 200 that includes a task broker 201 and a host machine 210. In some embodiments, the task broker 201 may run wholly or partly on the host machine 210. In other embodiments, the task broker 201 runs on a separate machine, and may perhaps support multiple host machines 210. The host machine 210 runs a number of virtual machines 211. The number of virtual machines that are run by the host machine 211 is not critical to the broader aspects described herein. However, to provide an example only, the virtual machines 211 are illustrated as including virtual machines 211A through 211H. The ellipses 211I symbolically represent that there may be more or less than this number, and that even the number of virtual machines running on the host machine 210 may change with time.

In one example embodiment, one or more of the virtual machines, the task broker, or any of the other software components described herein may be instantiated in a memory (such as memory 104 of FIG. 1) of a computing system (such as computing system 100 of FIG. 1) in response to the processor(s) (e.g., processor(s) 102) executing one or more computer-executable instructions that are on a computer-readable media that are at least part of a computer program product accessed by the computing system. Alternatively or in addition, one or more of the virtual machines, the task broker, or any of the other software components described herein may be operated by the computing system in accordance with one or more embodiments described herein in response to the computing system executing the computer-executable instructions.

Figure 3:
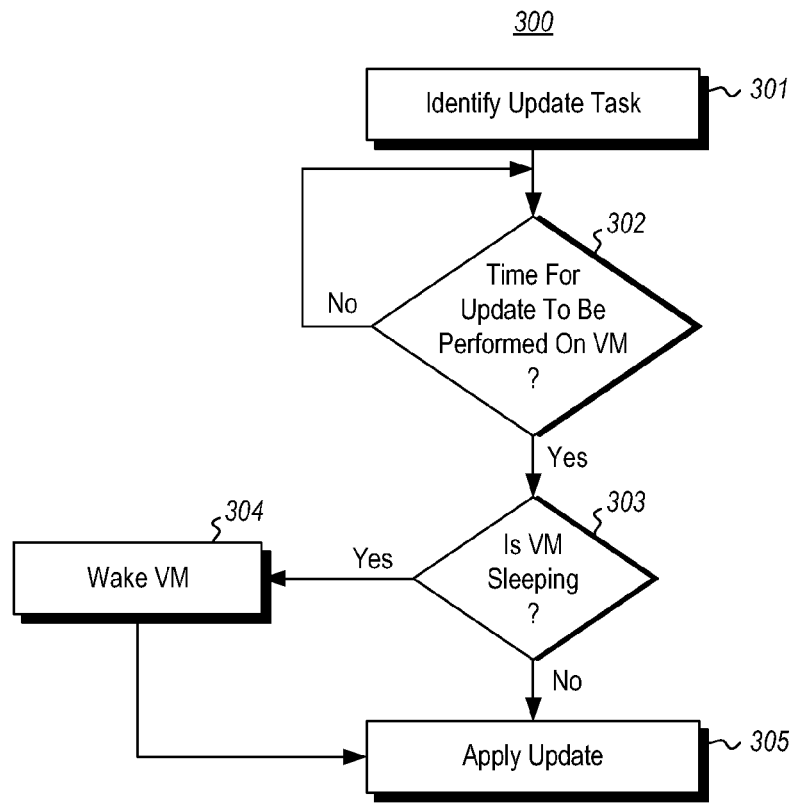
FIG. 3 illustrates a flowchart of a method for a task broker to perform update tasks for virtual machines running on a host machine.

FIG. 3 illustrates a flowchart of a method 300 that is performed by the task broker to schedule update tasks for virtual machines that run on a host machine. In some embodiments, the method 300 may be performed in the environment 200 of FIG. 2 by the task broker 201 of FIG. 2 on all or a subset of the virtual machines 211 of FIG. 2. Accordingly, the method 300 of FIG. 3 will now be described with frequent reference to the environment 200 of FIG. 2.

There is no limit to the update tasks that may be performed by the task broker 201 on the virtual machines 210. However, as an example only, an update tasks may include any one or more of the following: 1) an operating system upgrade task in which an operating system is installed or upgraded from a prior version, 2) an application installation in which a new application is installed on the virtual machine, 3) an application upgrade in which a new version of an application is installed or new functionality is added to an existing application, and 4) system configuration instructions in which system configuration is changed.

In accordance with the method 300, the task broker 201 identifies an update task to be performed (act 301). For instance, suppose that an operating system upgrade is to be performed on all virtual machines 211 running on the host machine 210. The task broker 201 schedules the update task in a manner that the host machine 210 is not overloaded as will be described further below.

For any given virtual machine, the task broker determines whether, at a given time, it is time to perform the update task on that virtual machine (decision block 302). If not (No in decision block 302), the method 300 does not progress, but simply waits until the update task is to be performed ("Yes" in decision block 302). At some point, the task broker 201 decides that it is time for the update task to be performed on the virtual machine ("Yes" in decision block 302).

At that time, it might be that the virtual machine is awake (i.e., is running) ("No" in decision block 303), or it might be that the virtual machine is sleeping (i.e., is not running but has saved state) ("Yes" in decision block 303). For instance, if the virtual machine were a personal virtual machine, the virtual machine is dedicated to a particular user and thus state is saved from one session to the next. In that case, the virtual machine may be sleeping in a saved state. This contrasts with a pooled virtual machine in which each virtual machine in the pool always starts with the same initial state, and thus state is not saved once the pooled virtual machine is closed.

If the virtual machine is sleeping ("Yes" in decision block 303), the virtual machine is caused to awake (act 304) in preparation for updating the virtual machine. For instance, the virtual machine may be configured to respond to an instruction from the task broker 201 to begin running In the case of the virtual machine already being awake and running ("No" in decision block 303), or alternatively after the virtual machine is caused to awake (act 304) in the case of the virtual machine having been sleeping ("Yes" in decision block 303), the update task is caused to be performed (act 305) on the running virtual machine. For instance, the virtual machine may be configured to respond to an instruction from the task broker 201 to perform the update.

When scheduling the update tasks on a larger number of virtual machines, the task broker 201 may perform the scheduling in a manner that the host machine is not overloaded due to the upgrade. Accordingly, the task broker 201 may determine an impact on the host machine before the causing a particular virtual machine to begin running For instance, the task broker may determine how many prior virtual machines have begun running and are still running to perform the update task. As an example, the task broker may be configured not to cause more than a certain number of virtual machines to be running the update task simultaneously. Alternatively or in addition, the task broker 201 may also consider performance metrics of the host machine (such as processor utilization, memory utilization, and the like). Thus, the task broker 201 causes the update task to be performed without significant impact to the currently running virtual machines, and without significantly impacting the overall performance capability of the host machine 210.

Figure 4:
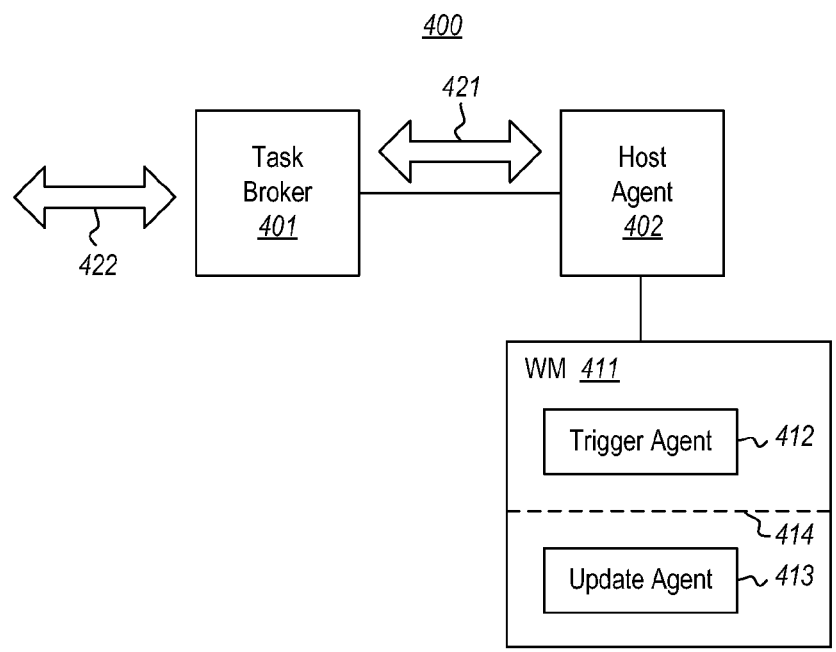
FIG. 4 illustrates an architectural diagram in which a trigger agent and an update agent in a virtual machine may assist with the update task.

FIG. 4 abstractly illustrates an example architecture 400 of the environment 200 of FIG. 2. In FIG. 4, only one virtual machine 411 is shown, but there may be an instance of the virtual machine 411 corresponding to every virtual machine either running or sleeping on the host machine 210. Nevertheless, for clarity, only the one virtual machine instance is shown. In this example, a host agent 402 intermediates between the task broker and each of the virtual machines (including virtual machine 411) running or sleeping at the host machine. The task broker 401 represents an example of the task broker 201 of FIG. 2. There may perhaps be one host agent 402 per host machine. Although not required, the host agent 402 may run wholly or partly on the host machine itself. The host agent 402 may also run on the same machine as the task broker 401 or even be wholly or partly integrated with the task broker, in which case there would not be a host agent for every host machine.

As represented by arrow 421 of FIG. 4 (and arrow 221 of FIG. 2), the task broker 401 may schedule the update task in response to a request from the virtual machine on which the update task is to be performed. Furthermore, the task broker 401 is also capable of receiving update tasks via a channel as represented by arrow 422 of FIG. 4 (and arrow 222 of FIG. 2)

for more urgent tasks. For instance, the arrow 222 may be implemented by a WMI interface that causes the update tasks to be performed right away, perhaps in the same day.

Figure 5:
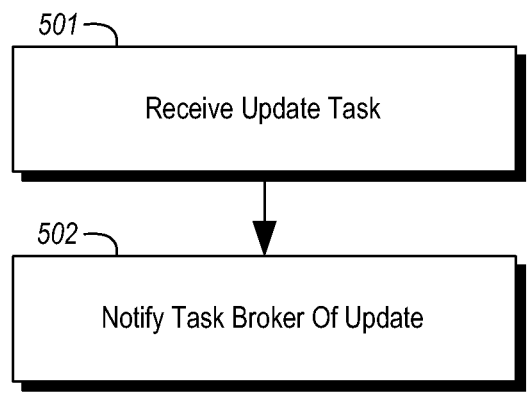
FIG. 5 illustrates a flowchart of a method for the virtual machine to request that an update to be performed.

FIG. 5 illustrates a flowchart of a method 500 for the virtual machine to request that an update be performed. For instance, this request may be represented in FIG. 4 by the virtual machine 411 requesting that the update be performed by the task broker 401. This request may be made indirectly via the host agent 402. In the illustrated embodiment, although not required, the virtual machine 411 includes a trigger agent 412 and an update agent 413 which communicate via an interface 414. In some embodiments, there may be multiple update agents using the common interface 414 to communicate with the trigger agent 412, in which each update agent corresponds to a particular updating instructor. As an example, a corporate IT department might have an update agent for each virtual machine. Furthermore, the seller of the product being updated might also have a dedicated update agent. Nevertheless, each update agent can communicate with the trigger agent as described herein in order to obtain the services of the trigger agent 412.

Referring to FIG. 5, the virtual machine receives an update task to be performed on the virtual machine (act 501). If the virtual machine includes a trigger agent 412 and an update agent 413, the appropriate update agent 413 corresponding to the update instructor initiating the update receives information identifying the update. The update agent 413 calls the trigger agent 412 using the interface 414 (which may be an application programming interface), causing the trigger agent 412 to communicate a request to schedule the update to the host agent 402 (act 502). The host agent then causes the task broker 401 to schedule the update task in a manner that the host machine is not significantly impacted while performing the update task on the virtual machine 411.

Figure 6:
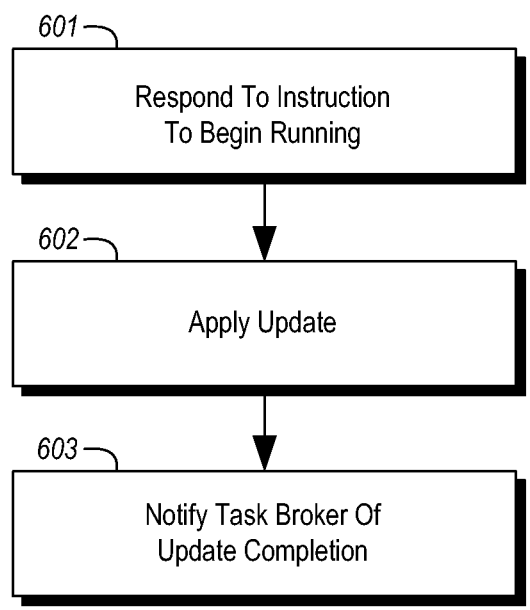
FIG. 6 illustrates a flowchart of a method for the virtual machine to have the update performed.

FIG. 6 illustrates a flowchart of a method 600 for the virtual machine to have the update performed once the task broker 401 determines that the upgrade is to be performed. If the virtual machine 411 includes the trigger agent 412 and the update agent 413, and if the virtual machine 411 is sleeping at the time the update task is to be performed, the task broker 401 communicates with the trigger agent 412. In response, the trigger agent 412 causes the virtual machine 411 to begin running (act 601). The trigger agent 412 receives the update task instruction from the task broker 401 (e.g., via the host agent 402), and communicates the update task instruction to the appropriate update agent 413 via the interface 414. The update agent 413 then performs the update task as instructed (act 602). After the update agent 413 performs the update (act 602), the update agent 413 notifies the task broker 401 that the update is complete (act 603). For instance, this may be accomplished by the update agent 413 calling into the trigger agent 412 using interface. Trigger agent 412 then notifies the task broker 401 via the host agent 402.

FIGS. 7 and 8A through 8E describe a mechanism for performing an update task on a pooled virtual machine. This is performed by updating a master image from which each of the pooled virtual machines derive the same initial state. The update operation may occur in the environment 200 of FIG. 2, or in the architecture 400 of FIG. 4, although that is not required.

Figure 7:
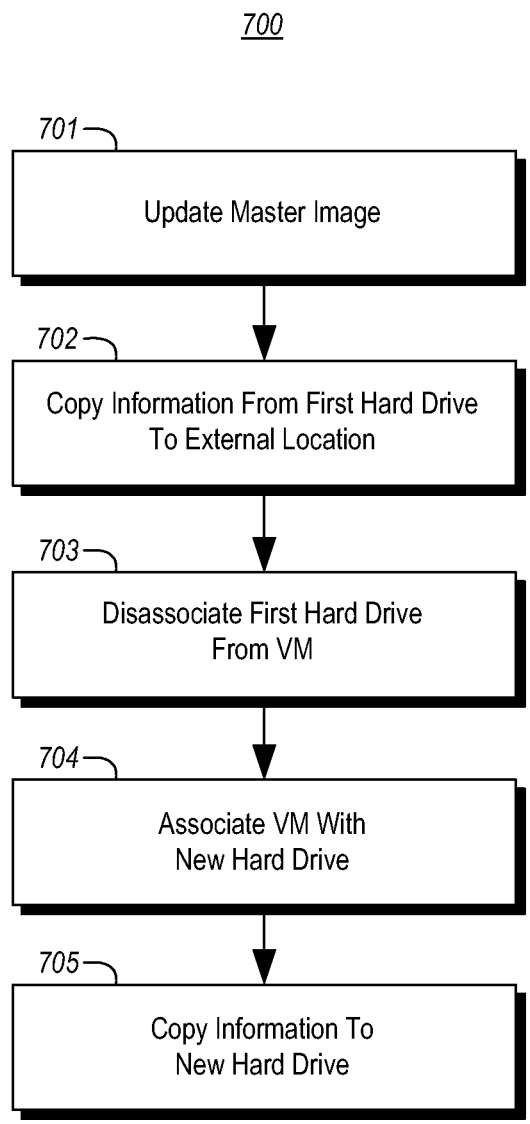
FIG. 7 illustrates a flowchart of a method for performing an update task on a pooled virtual machine.

FIG. 7 illustrates a flowchart of a method 700 for performing an update task on a pooled virtual machine. The task may, as an example only, include any one or more of the following: 1) an operating system upgrade task in which an operating system is installed or upgraded from a prior version, 2) an application installation in which a new application is installed on the virtual machine, 3) an application upgrade in which a new version of an application is installed or new functionality is added to an existing application, and 4) system configuration instructions in which system configuration is changed.

Figure 8A:
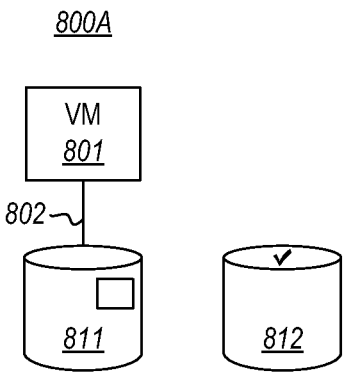
FIG. 8A illustrates a state of a pooled virtual machine environment after copying information from the virtual hard drive to an external location.

First, the master image from which the pooled virtual machine is created is updated to perform the update task (act 701). This results in the generation of an updated virtual hard drive that is derived from the updated master image. FIG. 8A illustrates a state 800A of the environment in which an updated virtual hard drive 812 is shown as available for future association with the pooled virtual machine 801. For now, however, the pooled virtual machine 801 remains associated (as represented by element 802) with the first virtual hard drive 811 that reflects a not updated state.

Figure 8B:
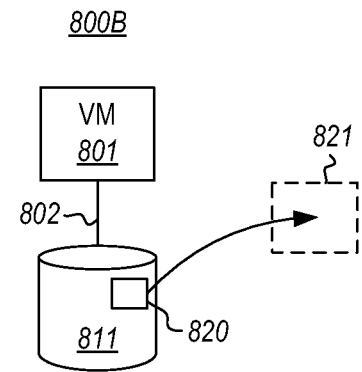
FIG. 8B illustrates a state of the pooled virtual machine environment after disassociating the virtual hard drive from the pooled virtual machine.

Information that includes information to be preserved across the update is copied (act 702) from the first virtual hard drive that is associated with the pooled virtual machine to a location external to the first virtual hard drive. FIG. 8B shows state 800B of the environment in which information 820 is copied to an external location 821. The external location may be any memory location outside of the virtual hard drive 811. Examples may include a pre-determined folder in the file system, or a pre-determined system memory location.

The information 820 includes information for which it would be helpful to have restored to a new virtual hard drive that is derived from the master image, once the master image is updated. For instance, the information 820 may include an identifier for the virtual machine, an identifier for an updating instructor, and/or perhaps some user data if the update is to occur before the user is able to properly complete a task before the update is to occur, but in which the user data would assist the users in completing the task. Once again, although the method 700 is described with respect to a single pooled virtual machine 801, the method 700 may be performed for many pooled virtual machines, and perhaps all pooled virtual machines running from the same master image that is to be updated. Accordingly, for some or all of those pooled virtual machines, information 820 may be copied to the external location.

Figure 8C:
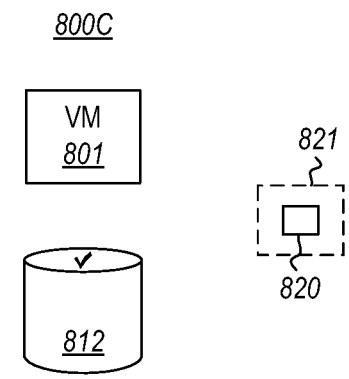
FIG. 8C illustrates a state of the pooled virtual machine environment after an updated virtual hard drive is created as a result of performing the update task on a master image.

The pooled virtual machine is then disconnected from the virtual hard drive (act 703). FIG. 8C illustrates this state 800C in which the virtual machine 801 no longer has access to a virtual hard drive due to the disassociation of act 703. Furthermore, information 820 is shown properly stored in external memory 821 due to the prior copying act 702. Other virtual machines in the pool may be similarly disassociated from their virtual hard drives.

Figure 8D:
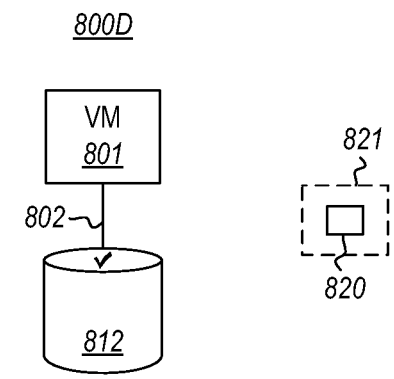
FIG. 8D illustrates a state of the pooled virtual machine environment after the pooled virtual machine is associated with the updated virtual hard drive.

The pooled virtual machine is then associated with the updated virtual hard drive (act 704). FIG. 8D illustrates the state 800D of this environment in which the pooled virtual machine 801 is associated (as represented by element 802) with the updated virtual hard drive 812.

Figure 8E:
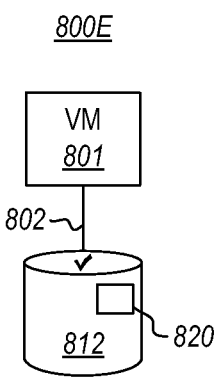
FIG. 8E illustrates a state of the pooled virtual machine environment after at least some of the information is copied back from the external location to the updated virtual hard drive.

At least some of the copied information is then copied from the external location to the updated virtual hard drive (act 705). FIG. 8E illustrates this state 800E of the environment in which information 820 is copied back into the updated virtual hard drive 812.

Accordingly, some embodiments described herein provide a mechanism for updating virtual machines running on a host machine in an orderly fashion. Furthermore, some embodiments described herein describe a mechanism for performing an update task on pooled virtual machines while keeping some information from prior to the upgrade.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-storage media having thereon one or more computer-executable instructions that are structured such that, when executed by one or more processors of a computing system, cause the computing system to operate a task broker,
wherein the task broker is configured to schedule update tasks for a plurality of virtual machines that run on a host machine, and for at least one update task of the scheduled update tasks performing the following:
an act of determining that the at least one update task should be performed;
an act of determining whether the virtual machine is asleep or awake once it is determined the at least one update task should be performed by the virtual machine;
wherein when it is determined the virtual machine is asleep:
causing the virtual machine on which the at least one update task is to be performed to begin running in preparation for updating the virtual machine; and
an act of causing the at least one update task to be performed on the running virtual machine; and
wherein when it is determined the virtual machine is awake then causing the at least one update task to be performed on the running virtual machine.

2. The computer program product in accordance with claim 1, wherein the task broker is configured to further determine an impact on the host machine before the act of causing the virtual machine to begin running.

3. The computer program product in accordance with claim 1, wherein the task broker is configured to determine first how many prior virtual machines have begun running and are still running to perform update tasks prior to the act of causing the virtual machine to begin running.

4. The computer program product in accordance with claim 1, wherein the task broker schedules the update task in response to a request from the virtual machine on which the at least one update task is to be performed.

5. The computer program product in accordance with claim 4, wherein the task broker is also capable of receiving update tasks via a channel for performing update tasks urgently.

6. The computer program product in accordance with claim 1, wherein at least some of the update tasks include operating system upgrade tasks.

7. The computer program product in accordance with claim 1, wherein at least some of the update tasks include application installation instructions.

8. The computer program product in accordance with claim 1, wherein at least some of the update tasks include application upgrade instructions.

9. The computer program product in accordance with claim 1, wherein at least some of the update tasks include system configuration instructions.

10. The computer program product in accordance with claim 1, wherein the virtual machine is a personal virtual machine.

11. The computer program product of claim 1, wherein it is determined the virtual machine is asleep.

12. A computer program product comprising one or more computer-storage media having thereon one or more computer-executable instructions that are structured such that, when executed by one or more processors of a computing system, cause the computing system to operate a virtual machine,
wherein the virtual machine is configured to receive an update task to be performed on the virtual machine, and notify a task broker that the update task is to be performed on the virtual machine, wherein the task broker schedules the update task into an update schedule based on the notification from the virtual machine, and
wherein if the virtual machine is not running when the update task is to be performed based on the update schedule with the task broker, the virtual machine is configured to respond to an instruction from the task broker to begin running from the task broker, and perform the update task upon instruction from the task broker.

13. The computer program product in accordance with claim 12,
wherein the virtual machine includes a trigger agent and an update agent, wherein the update agent receives the update task to be performed on the virtual machine, and the trigger agent communicates with the task broker by notifying the task broker of the update task and receiving the instruction to perform the update task from the task broker when it is time to perform the update, wherein the update agent performs the update task on the virtual machine.

14. The computer program product in accordance with claim 13, wherein the update agent is a first update agent that performs updates to the virtual machine by a first entity, the virtual machine further including a second update agent that performs updates to the virtual machine by a second entity.

15. The computer program product in accordance with claim 14, wherein the first update agent and the second update agent use a common interface to communicate with the trigger agent.

16. The computer program product in accordance with claim 12,
wherein the virtual machine communicates with the task broker indirectly through a virtual machine host agent.

* * * * *